No. 733,576. PATENTED JULY 14, 1903.
D. COUSINNE.
CIGAR MAKING MACHINE.
APPLICATION FILED MAR. 7, 1896.
NO MODEL. 6 SHEETS—SHEET 2.
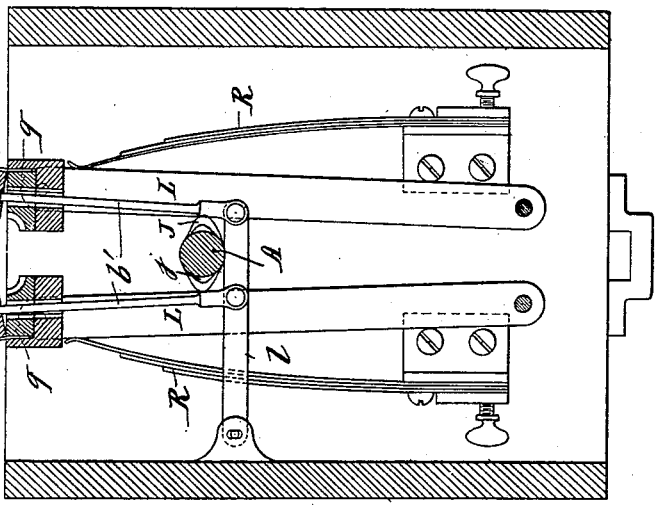
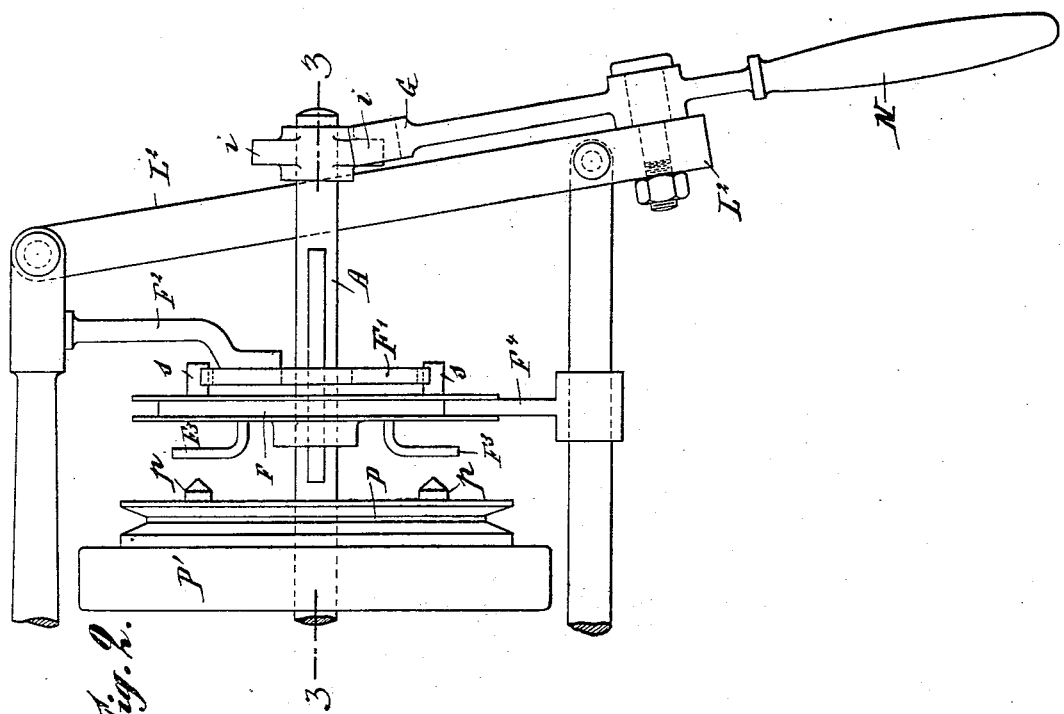
WITNESSES:
Isabella Waldron
Mildred Ida Welch
INVENTOR
Denis Cousinne
BY
Richard R.
ATTORNEYS.

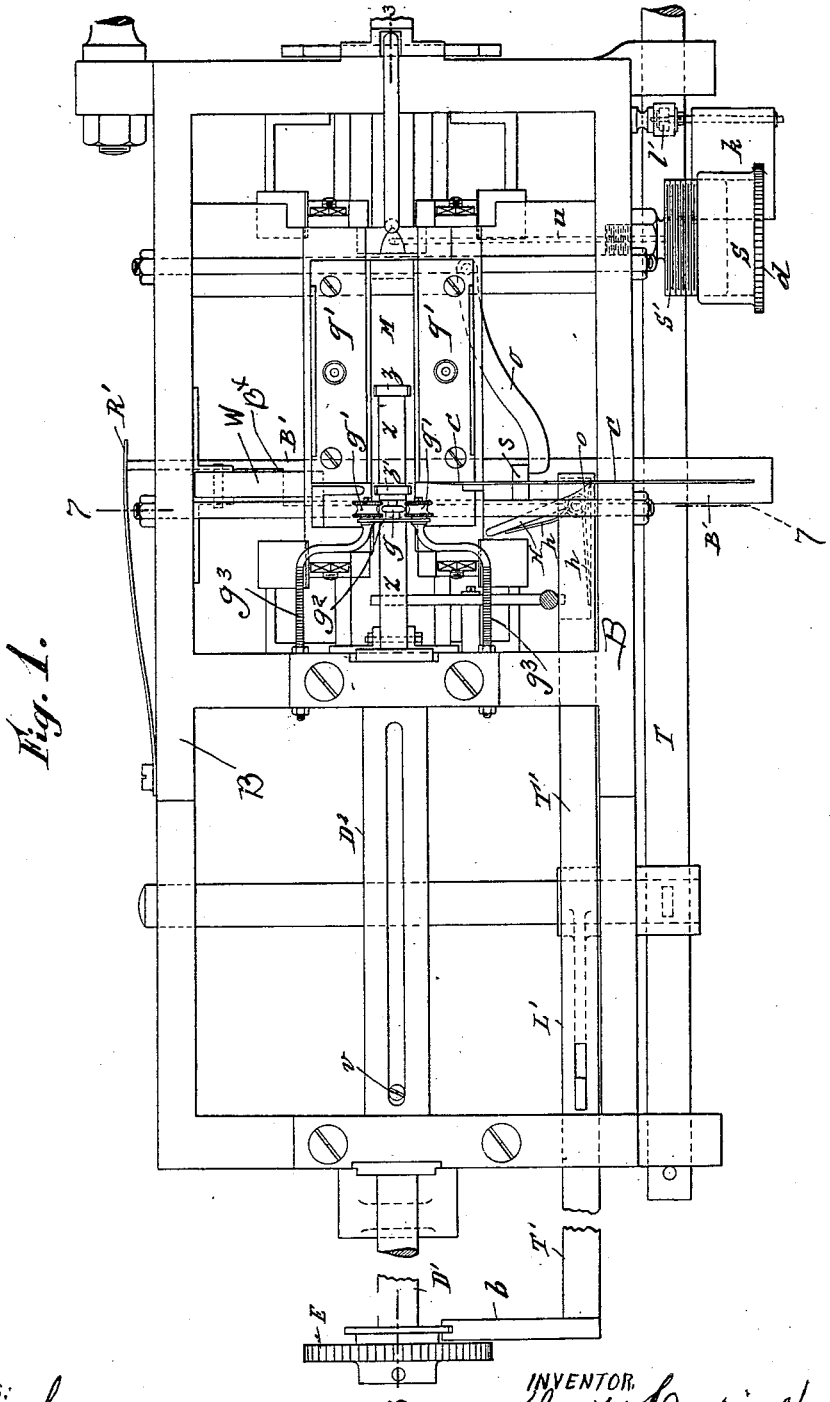

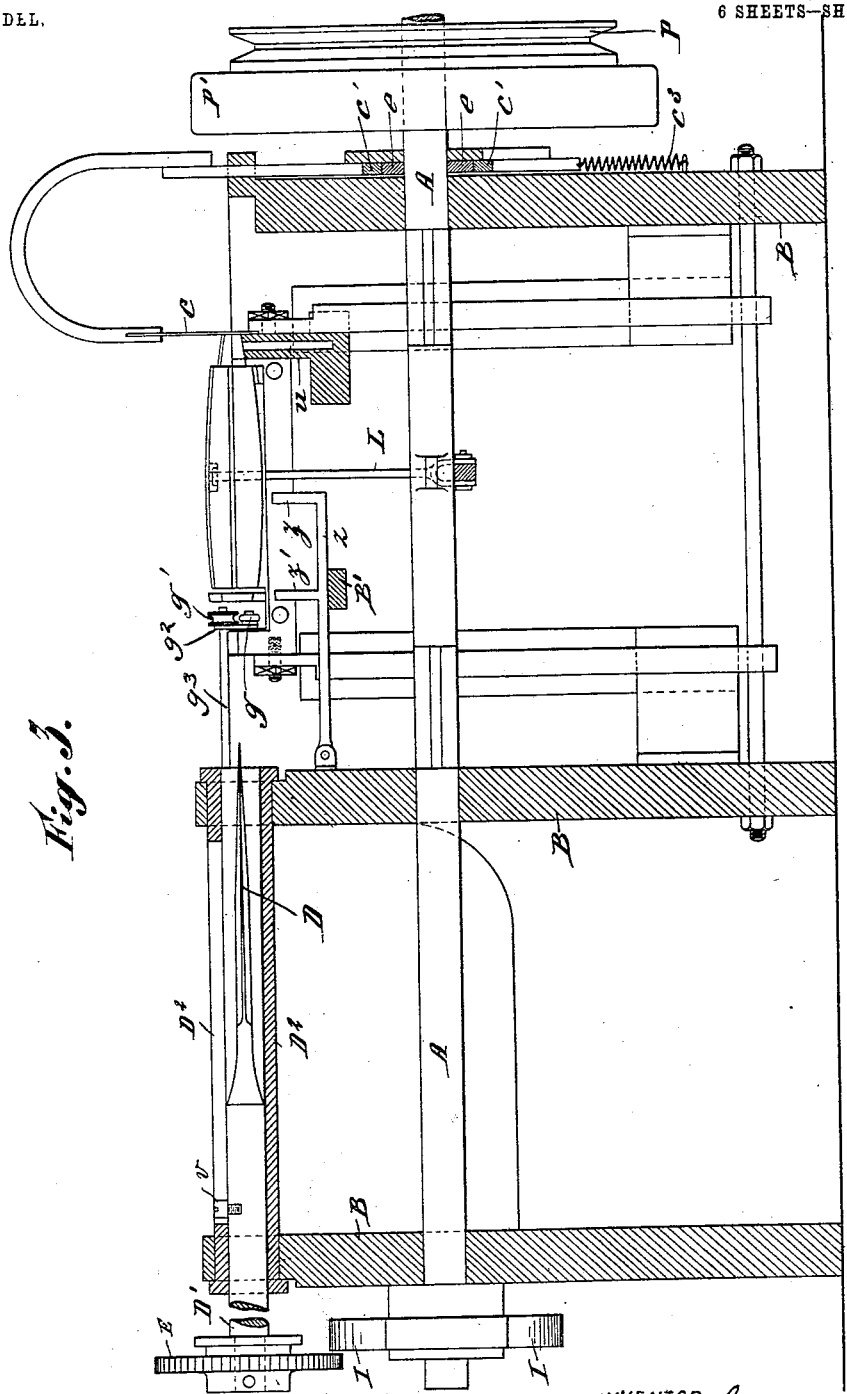

No. 733,576. PATENTED JULY 14, 1903.
D. COUSINNE.
CIGAR MAKING MACHINE.
APPLICATION FILED MAR. 7, 1896.
NO MODEL. 6 SHEETS—SHEET 4.
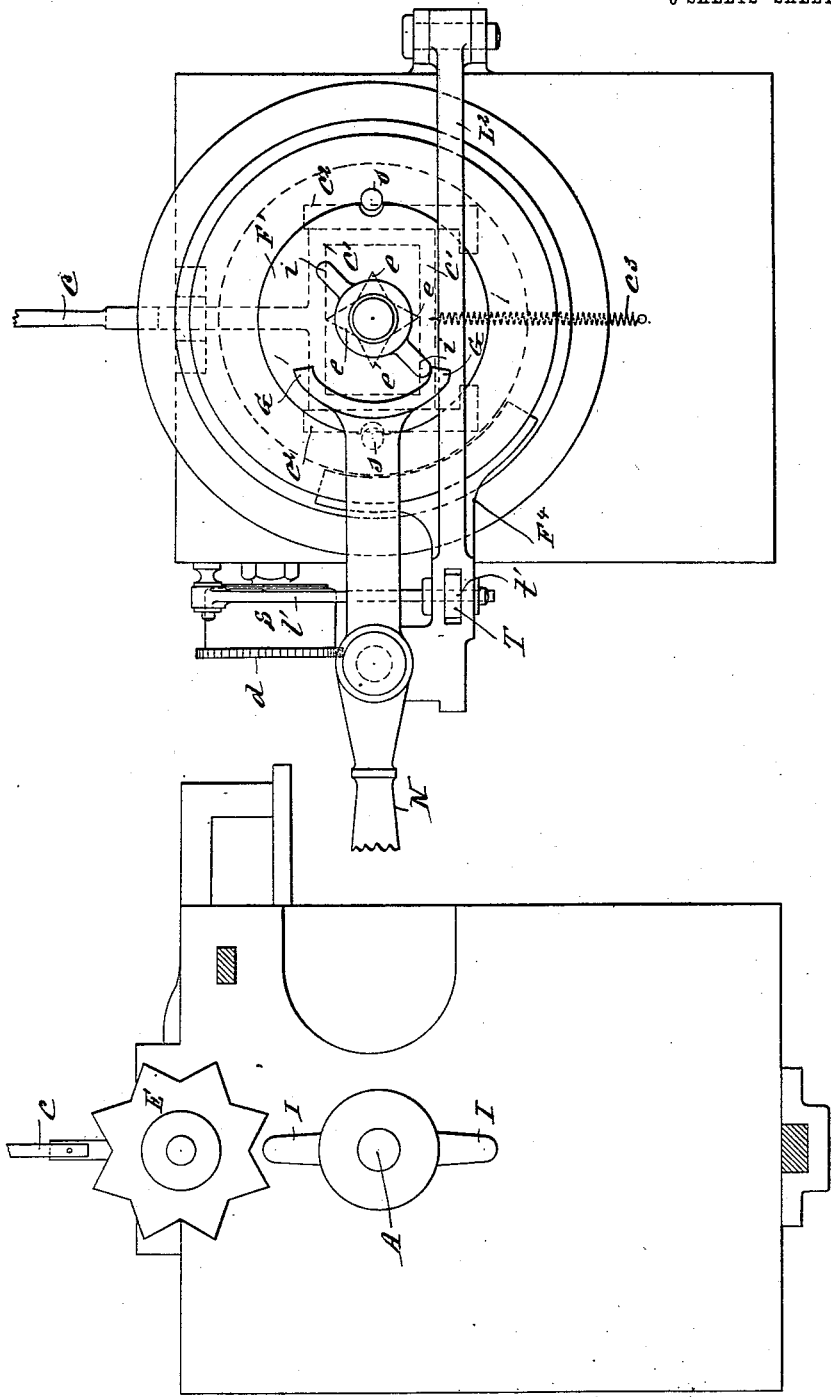
WITNESSES:
Isabella Waldron
Mildred Ida Welch
INVENTOR
Denis Cousinne
BY
Richardson
ATTORNEYS.

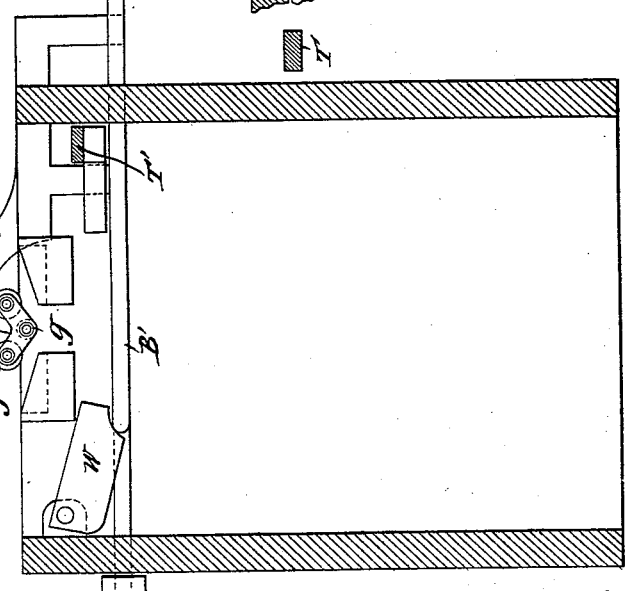

No. 733,576. PATENTED JULY 14, 1903.
D. COUSINNE.
CIGAR MAKING MACHINE.
APPLICATION FILED MAR. 7, 1896.
NO MODEL. 6 SHEETS—SHEET 6.
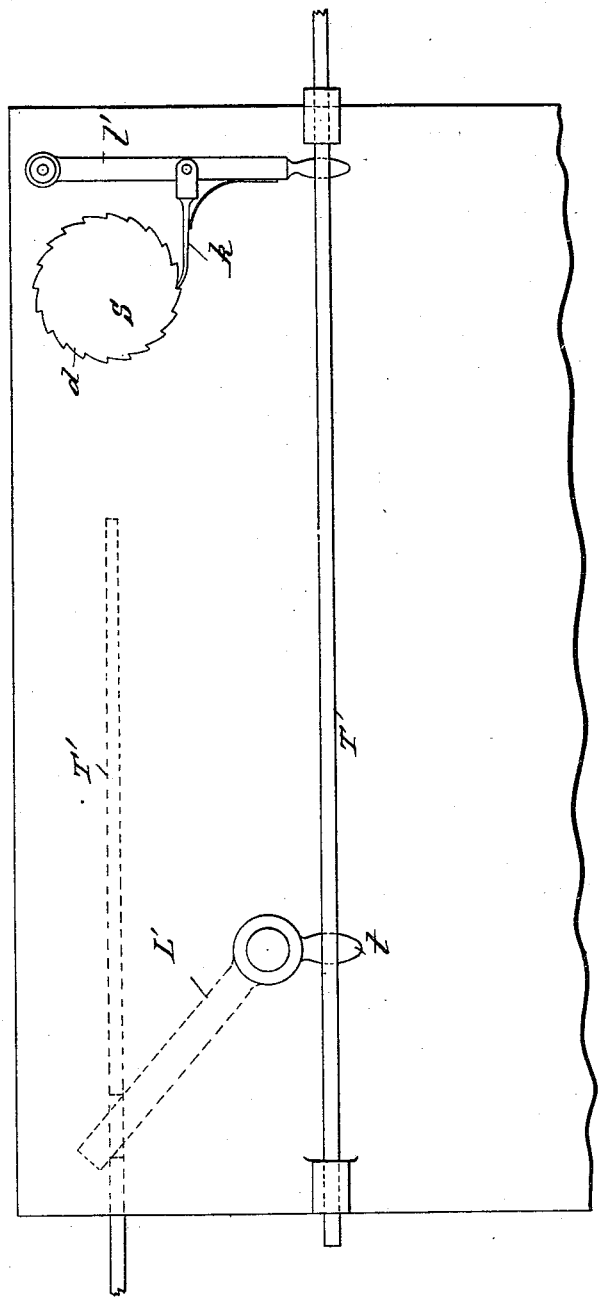
WITNESSES:
Isabella Waldron
Mildred Ida Welch
INVENTOR.
Denis Cousinne
BY
Richardson
ATTORNEYS.

No. 733,576. Patented July 14, 1903.

UNITED STATES PATENT OFFICE.

DENIS COUSINNE, OF HORRUES, BELGIUM.

CIGAR-MAKING MACHINE.

SPECIFICATION forming part of Letters Patent No. 733,576, dated July 14, 1903.

Application filed March 7, 1896. Serial No. 582,238. (No model.)

*To all whom it may concern:*

Be it known that I, DENIS COUSINNE, physician, a subject of the King of Belgium, residing at Horrues, in the Kingdom of Belgium, have invented a new and useful Cigar-Making Machine, (for which patents have been obtained in Belgium, dated August 8, No. 117,080, addition, dated February 3, No. 91,961 of certificate; in France, dated February 3, No. 240,959 of certificate; in Italy, dated February 4, No. 59 of certificate; in Great Britain, dated February 6, No. 2,766; in Luxemburg, dated February 4, No. 2,447; in Russia, dated February 7, No. 2,216 of certificate; in Sweden, dated February 8, No. 154 of certificate; in Austria, dated February 7; in Hungary, dated February 7, No. 10,027 of certificate; in Denmark, dated February 6; in Norway, dated February 7, No. 7,329 of certificate; in Spain, dated February 8, of certificate; in Switzerland, dated February 10, No. 12,846,) of which the following is a full, clear, and exact description.

The machine for manufacturing or more precisely for wrapping the cigars into their exterior leaf which constitutes the subject of the present invention consists in means for fixing the cigar in the direction of its axis or at least in its interior to give it a rotary motion in order to wrap it into its cover and to compress it during this operation in a longitudinally-divided mold which opens and closes at stated periods, so as to give to the cigar the desired exterior form and compactness.

A machine constructed according to the above-stated principles is represented in the accompanying drawings, wherein—

Figure 1 represents a plan view of the left side of the machine. Fig. 2 represents a plan view of the right side of the machine. Fig. 3 represents a partial longitudinal section of the machine on the line 3 3 of Figs. 1 and 2. Fig. 4 represents a vertical section through the mold with its accessories. Fig. 5 is a view of the back side of the machine. Fig. 6 is a view of the front side of the machine. Fig. 7 is a cross-section, parts in elevation, on line 7 7 of Fig. 1. Fig. 8 represents a side elevation of the detailed parts of the driving-gear. Figs. 9 and 10 represent two plan views, partly in section, showing two positions of the driving-gear of the knife which cuts off the back end of the cigar. Figs. 11 and 12 represent, respectively, a plan and an elevation of the details of the ejecting mechanism.

The securing of the cigar in the direction of its axis is effected by means of a dart or a needle D, preferably of a triangular form— that is to say, having three finely-grooved and tapered sides which pass through one part or through the entire length of the filler as far as its pointed end. After the filler has been secured in this manner upon the dart the latter allows it to be turned at intervals, so that the leaf within the mold M can be wrapped. The latter consists of four longitudinal shells which represent inside the profile of the cigar when they are concentrated around the axis of the dart, which coincides with that of the mold, and the opening and closing or the separation and concentration of the shells $q\ q\ q'\ q'$ is effected by means of the lateral separation of the pairs of shells $q\ q'$ and the simultaneous rising of the two upper shells $q'\ q'$, the time during which the closing or molding takes place corresponding to the duration of the stopping and the time during which the opening or wrapping takes place corresponding to the duration of the rotation of the cigar with the dart, which after having been wrapped is withdrawn, so as to admit the cutting off of the back end in such a manner that the dart describes besides its intermittent rotary movement also a periodical alternate motion in a longitudinal direction. Consequently this machine, to the full completion of which belong also one set of rollers for the initial moving forward of the wrapper upon the filler, a contrivance for trimming the pointed end of the cigar, further, an ejector and the mechanism for driving the various parts in the order as they work, combines with a very simple construction the advantages of admitting a very easy and rapid mode of manufacture. The periodical movements required for rotating and separating and for concentrating the dart and the jaws are transmitted by means of the principal driving-shaft A, which carries for this purpose on one of its ends the driving-pulley P, at its middle a set of cams $J\ j$, which actuate a pair of connected levers L L, operating the mold M, and on its opposite end it carries a double cam I, which determines the periodical rotation of dart D by means of actuating a star-wheel E, arranged upon the dart-bearer. The remaining movements which have to be effected—such as the moving back or the advancement of the dart in a longitudinal direction, the transverse advancement of the knife $c$ for cutting off the tip end of the cigar, and the final opening of the mold—are, with the exception of the trimming-knife $c$, which is actuated by two cams $e\ e$ of the driving-shaft, effected by means of the disengaging rod T at the time when the machine is stopped by means of disengaging the driving-pulley P, which is loose, from the friction coupling-box F, wedged upon the main shaft.

The dart-holder is composed of a shaft $D'$, guided longitudinally by means of a screw-head $v$ in a slot of a sleeve or socket resting at its ends in bearings of the frame B and rotated in the periodical rotation of $D'$ by means of the screw $v$. The periodical rotation is obtained by means of gearing together the double cam I of the shaft A, bearing in the frame at a convenient height, with the star E, wedged upon the end of the dart-holder $D'$. The screw $v$ limits also the longitudinal progressive and retrograde motion of the dart, and this motion is transferred to it at the desired moments with the aid of the connecting-rod T, which embraces by means of a slit the tappet $t$ of the lever $L'$, Figs. 1 and 8, which works loosely at its ends in a slit of the auxiliary rod $T'$, joined by an arm $b$ to the dart-holder $D'$, which thus advances or goes back according to whether the lever $L'$ moves in one direction or in the other. In Fig. 1 it is shown in the back position—that is to say, the machine is disconnected and the mold M receives the filler through which the dart D then passes in the direction of its axis when the lever $L'$ is reversed.

The four shells which compose the mold M are arranged in pairs. The two upper shells $q'\ q'$ are joined with the two lower shells $q\ q$, by means of two springs $r\ r$, which keep them usually open in a vertical direction. The two pairs of shells $q\ q'$ are traversed by the two connecting-rods $b''\ b'$, joined at their lower ends to a lever $l$, which is united by means of a pivot with the frame, and as soon as the double cam $j$ on the shaft A depresses the lever $l$ the shells $q'\ q'$ close upon the lower shells. This descent of the upper shells coincides with the lateral approaching of the lower shells $q\ q$ under the exterior pressure of the springs R R, attached at one end to the frame and pressing with the other end upon the levers L L, which support with one end the shells $q\ q$ and are united at the other end by a pivot with the frame and which diverge under the pressure of the double cam J of the shaft A. As all the three cams I J $j$ have two high parts and as that one which actuates the dart D is placed a quarter-turn to those of the mold M, it can be seen that the period when the dart rotates and when the mold opens, as well as those when the former is stopped and the latter closed, coincide always exactly. Besides, the alternate separation and the concentration of the shells of the mold brought about by the continuous rotation of the shaft A the mold can be kept definitely open at the time when the machine is stopped by means worked by hand, which places the cams J $j$ for this purpose into the corresponding position. This driving-gear, Figs. 2 and 6, consists of a clutch-lever G, which pivots upon the articulated lever $L^2$, to which the connecting-rod T is attached. The clutch-lever is operated by a handle N, and when operated it causes the cam $i\ i$ to rotate to the desired extent in order to keep the mold open as long as the machine stops.

The pulleys $g'\ g\ g'$ are to facilitate the introduction and the advancing of the covering-leaf placed around the filler of the cigar. These three pulleys turn upon the three extreme points of a piece $g^2$, having the form of a V, which is fastened to the frame by two rods $g^3$ being bent around in an appropriate manner, so as to locate the pulleys before the back end of the mold M, Figs. 1 and 3. The filler placed in the mold reposes with its end upon the lower pulley $g$, between the two pulleys $g'\ g'$. The leaf is introduced between one of the pulleys $g'$ and the filler and drawn along by the latter when it is caused to rotate by the dart D, and being held in position against the filler by the said pulley $g'$ and passing upon the pulley $g$, which holds it likewise in position against the filler, it comes also back always held in position by the second pulley $g'$ against the upper—that is to say, until the first revolution of the cigar has been described—so that in this moment the second revolution of the leaf wraps in the end which comes back uppermost in the desired position, so that the action of the pulleys makes sure the perfect wrapping in from the very beginning.

The mechanism which actuates the knife $c$ for trimming the pointed end of the cigar consists of a frame $c'$, which is guided between two lateral slides $c^2$ in such a manner as to admit an ascending and descending motion to be effected. Usually this frame $c'$ is drawn toward the lower part by means of a spiral metallic spring $c^3$ and rests with its lower side upon the lower ends in cleats of the lateral slides $c^2$. Under the upper cross-piece of the frame $c'$ is wedged upon the main shaft A of the machine a cam $e$ with four points, each of which lifts the frame with the knife $c$ when the shaft rotates, while it descends under the pull of the spring as soon as the interval between two points is placed opposite the cross-piece. In this manner the knife $c$ rises and descends, so that it passes four times before the pointed end of the cigar for one revolution of the shaft.

The glue-cup $S'$, which is arranged so as to supply the glue required for gluing the pointed end, consists of a simple cylindrical cup provided with a screw-thread all over its exterior perimeter, upon which is screwed the cover S, having the same length as the cup and threaded inside with a corresponding thread. This cup is screwed with its perforated tubular part to the frame in a horizontal position in such a manner as to connect with a channel formed in the frame and connecting with the pointed end of the mold. The edge of the cover is provided with teeth, so as to form a ratchet $d$, Fig. 8, into which engages a click $k$, the width of which is approximately equal to the length of the cup in order to maintain engagement with the ratchet in all its positions. This click $k$, Figs. 1 and 8, is pivoted to a lever $l'$, pivoted at one end on the frame and engaging at the other end with the driving-bar T. When the cover is put on the cup and the space between is filled with glue, the cover is screwed on the cup so that only a few threads are engaged. It can be easily understood that each time the bar T while traveling toward the left causes the cover to turn to the extent of a number of teeth of the ratchet $d$ by means of the click $k$ the cover moves upon the cup to the extent of a fraction of the spire or thread, compressing thus the glue, a corresponding quantity of which runs through the channel $u$ toward the pointed end to be glued.

The knife C, used for cutting off the tuck end of the finished cigar is fitted upon a bar B', arranged and guided transversely in the frame B, so that the knife C can be advanced exactly between the pulleys $g'$ $g$ $g'$ and the back end of the mold M and to cause it to return into its original position after having accomplished this work. To this purpose the knife with the cross-bar B' are normally maintained in the original position or in the position into which they have been moved back by means of a spring R', which is screwed with one of its ends on the frame B, while its free end bears against the end of the bar B', reduced to the width of a simple rod on this side in order to admit the descent or the passage of a wedge W, fastened to the frame by a pivot for the purposes stated hereinafter. Therefore the spring R' is driven back or extended when the knife C is pushed forward to cut off the cigar, and it brings the knife back again as soon as the pressure upon the bar B' has ceased. This pressure, which causes the knife to advance, is exerted upon a cleat S of the bar B' by means of a curved lever O, pivoting horizontally upon the frame at one of its ends, while the free end rests against the cleat S. This lever O is operated in such a manner as to cause the bar B' to advance by means of a finger H, pivoted at the end of the driving-rod T', so that it is normally maintained in the position shown in Fig. 1 by a bent spring $h$, placed with the finger H in a hollowing of the driving-bar T', Figs. 1, 7, 8, 9, and 10, the driving-bar T' being connected with the main driving-bar T by the bent intermediate lever L', and as both are guided longitudinally in the frame it can be easily seen that if the bar T is actuated toward the left by means of the handle N then the bar T' will travel to the right in proportion as the bent lever L' is reversed, and vice versa. In the first case—that is to say, when the machine is thrown in gear and the lever T' is pushed to the right—the finger H will strike against the end of the lever O and falls back, depressing thus the spring $h$, Fig. 9, so as to pass below the said lever, and to rise thereupon under the action of the spring, so far as the curve of said lever admits this, as shown in Fig. 10. If, in order to throw the machine out of gear, after the wrapping in of the cigar has been done, the driving-bar T is thrown to the right by means of the handle N, then the bar T' is pushed toward the left and carries along with it the finger H from the position shown in Fig. 10 into that position shown in Fig. 1. While traveling over its course, the finger H, which the heel $o$ prevents from giving way to the right, slides with its end on the lever O, which pushes forward the bar B', with the knife C, which cuts off the cigar. While this movement is made, the edge of the front part of the bar B' glides on the cut-off angle of the wedge W (which normally descends on account of its own weight into the cut-out part B$^\times$ of the bar, so as not to hinder the opening movement of the mold M) and lifts up this wedge, which rides upon the bar B', and the front end of which places itself then before that side of the mold (being closed at that moment) which is opposite the knife C in order that the impact exerted by the latter upon the cigar may not make this part of the mold (closed only by the pressure of spring R) to be moved back, causing thus an irregular cutting off, which would disfigure the cigar. As soon as the spring R' has brought back the bar B' the wedge will fall into its cut-out part and will not oppose any longer the work of the mold, being effective only during the one single moment when the cutting off is effected, which is finished the very moment when the finger H, returning to the left, has gone beyond the end of the lever O, this being also the moment when the bar B' returns behind, unwedging the mold and leaving it open.

The driving-bar T', which accomplishes at the same moment its movement toward the left, effects the ejection of the cigar by means of a wedge $f$, fixed on the inner side of its right end, as shown in Figs. 11 and 12. This wedge $f$ passes upon the end of the lever $l^2$, which pivots transversely in the middle on the end of a tenon $l^3$, fastened horizontally on the frame, while its opposite end is passed below a lever Z, pivoting at its back end on the frame in a longitudinal direction and in the axis of the machine and supporting two vertical arms $z z'$, Figs. 1, 3, 12. While the wedge $f$ depresses then rapidly the lever $l^2$ at one end, the other raises the lever Z, the arms $z\ z'$ of which throw the cigar and the end which has been cut off out of the mold. Under normal conditions the lever Z rests upon the bar B', which glides under it; but which exerts no other influence upon it.

The shaft A of the machine is operated in the following manner: Under normal conditions the pulley P, in one piece with the fly-wheel P', turns loose on the said shaft, so that the belt does not carry along in its movement the shaft when the machine is thrown out of gear—that is to say, when the disk F, which can slide longitudinally in the two directions upon an appropriate pin of the shaft A, is moved away from the pulley P toward the right, Fig. 4, by means of the arm $F^4$, fixed upon the bar T and projecting into the groove of the disk, which it carries along thus in the direction of the movement imparted to the bar T by means of the handle N, belonging to the lever $L^2$. If, on the contrary, the disk is brought near the pulley P, clutches $F^3$ of the disk are pressed upon points $p\ p$ of the pulley P, which is thus fastened to the disk F, and carries it along with the shaft A, as long as it remains in this position of being engaged, which it leaves to stop the machine if the driving-lever makes the least movement toward the right. If the mold has to be kept then permanently open, the lever N is lowered while being drawn to the right, which causes the cam $i\ i$ at the end of the shaft to be raised by means of the arm G into the horizontal position and to cause the tenons $s\ s$ of the disk F to enter into the corresponding notches of the disk F', Figs. 2 and 6, so that there is wedged the shaft A, and with it the cam J, into the position of maximum opening of the mold, Fig. 4, until a new raising of the lever N, while it is drawn simultaneously toward left disengaging all the parts and throws the machine into gear.

The working of the machine can be seen without difficulty from the above description.

If the machine is thrown out of gear—that is to say, if it is in the position represented in the drawings, the filler is introduced into the mold by means of placing its back end between the pulleys $g'\ g\ g'$. When the machine is thrown into gear by means of pushing back the lever $L^2$, with the aid of the handle N, toward the left, after having raised it in order to release F and to close the mold, the dart penetrates into the filler and the periodical operation is established, the finger H is passed below the lever O, against which it raises itself, and the fountain S has poured forth a little glue into the pointed end of the mold, this whole operation being effected by means of the one throwing into gear. Then the leaf is placed between the pulleys $g'\ g\ g'$ and the machine continues to run at intervals until the wrapping-in is finished and the pointed end has been trimmed with the aid of the knife $c$. The throwing out of gear is thereupon effected by means of pushing the lever $L^2$ to the right, the dart D goes back and the knife $c$ cuts the cigar. The operator then moves the lever N, wedges up the machine, opens the mold, and throws out the cigar, the whole being brought about by means of one single movement of throwing out of gear, and then the same series of operations begins anew.

I claim—

1. In combination in a cigar-making machine, a rotary needle for holding the filler, a mold made up of sections adapted to separate, a main shaft, connections therefrom to the rotary needle for giving the same a step-by-step rotation, springs R and connections from the main shaft to the sections of the mold for opening and closing the same, substantially as described.

2. In combination, the rotary needle with operating means therefor, a mold comprising four separable sections with means for opening and closing the same in pairs laterally and for separating vertically the members of each pair, a set of rollers adjacent to the mold for guiding and holding the outer leaf, a paste-supply apparatus having a discharge-outlet leading to the mold, means for operating the said supply apparatus, cutting-knives, one at each end of the cigar, means for operating the knives, mechanism for locking the machine and for causing the mold to open, and an ejector with operating means therefor, substantially as described.

3. In combination, the mold comprising the four separate shells arranged in pairs, the levers carrying the pairs, the connections $b'$, $b'$, for operating the upper members of each pair of shells, the cams for operating the levers, and the parts $b'$, $b'$, a rotary needle for holding the filler, and the cam and star-wheel for giving the said needle a step-by-step rotary movement, a release-rod T, an auxiliary release-rod T' connected thereto, and a trimming-knife, cams on the main shaft for operating the same, a cutter for the butt of the cigar, a pivoted finger on the auxiliary coupling-rod, a spring for maintaining the same in position substantially at right angles to the said rod, and a lever to be operated by the said finger, and operating against the cutter-holder.

4. In combination in a cigarette-machine, a mold comprising four shells arranged in pairs, means for moving said pairs toward and from each other, means for moving the members of each pair toward and from the other, a dart for holding the cigar and means for turning the dart at intervals when the mold is open, substantially as described.

DENIS COUSINNE.

Witnesses:
  AUG. JOERISSEN,
  H. FRANÇOIS.